United States Patent
Catalano et al.

(10) Patent No.: US 10,567,913 B2
(45) Date of Patent: Feb. 18, 2020

(54) PROXIMITY SERVICE ACCESS IN A MOBILE COMMUNICATION NETWORK

(71) Applicant: TELECOM ITALIA S.p.A., Milan (IT)

(72) Inventors: Carmen Catalano, Turin (IT); Maria Pia Galante, Turin (IT); Mario Madella, Turin (IT); Marco Marchisio, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 16/343,280

(22) PCT Filed: Oct. 25, 2016

(86) PCT No.: PCT/EP2016/075629
§ 371 (c)(1),
(2) Date: Apr. 18, 2019

(87) PCT Pub. No.: WO2018/077381
PCT Pub. Date: May 3, 2018

(65) Prior Publication Data
US 2019/0261132 A1    Aug. 22, 2019

(51) Int. Cl.
*H04W 24/00* (2009.01)
*H04W 4/02* (2018.01)
(Continued)

(52) U.S. Cl.
CPC ........... *H04W 4/023* (2013.01); *H04W 48/16* (2013.01); *H04L 67/306* (2013.01); *H04W 8/005* (2013.01)

(58) Field of Classification Search
CPC ..... H04W 4/023; H04W 48/16; H04W 8/005; H04W 4/02; H04L 67/306
See application file for complete search history.

(56) References Cited

U.S. PATENT DOCUMENTS

2014/0273850 A1* 9/2014 Park ................. H04W 76/14
                                                                    455/41.2
2014/0357269 A1* 12/2014 Zhou ................ H04W 76/14
                                                                    455/434
(Continued)

FOREIGN PATENT DOCUMENTS

WO    WO 2015/170874 A1    11/2015

OTHER PUBLICATIONS

"3rd Generation Partnership Project; Technical Specification Group Services and System Aspect; Study on architecture enhancements to support Proximity-based Services (ProSe) (Release 12)," 3GPP TR 23. 703 V 12.0.0, Feb. 2014, https://www.arib.or.jp/english/html/overview/doc/STD-T63v11_00/5_Appendix/Rel12/23/23703-c00.pdf, retrieved on Dec. 15, 2016, 324 total pages, XP055329411.
(Continued)

*Primary Examiner* — Dai Phuong
(74) *Attorney, Agent, or Firm* — Oblon, McClelland, Maier & Neustadt, L.L.P.

(57) ABSTRACT

A method for accessing a proximity service in a mobile communication network including a network module and a user equipment (UE) including a primary radio interface that operates according to a first radio access technology providing connection to the network, and at least one secondary radio interface that operates according to at least one second radio access technology different from the first one is described. The network module communicates with the UE for enabling it to access the service. The method includes sending by the UE to the module a request message, at the module, generating an answer message adapted to enable access to the service by the UE over the primary radio interface, and converting the answer message into at least one further answer message adapted to enable access to the service by the UE over the at least one secondary radio interface.

15 Claims, 5 Drawing Sheets

(51) Int. Cl.
*H04W 48/16* (2009.01)
*H04W 8/00* (2009.01)
*H04L 29/08* (2006.01)

(56) References Cited

U.S. PATENT DOCUMENTS

| | | | | |
|---|---|---|---|---|
| 2014/0378123 A1* | 12/2014 | Stojanovski | .......... | H04W 48/08 |
| | | | | 455/422.1 |
| 2015/0215990 A1* | 7/2015 | Lee | ........ | H04W 48/12 |
| | | | | 455/434 |
| 2015/0305077 A1* | 10/2015 | Johnsson | .......... | H04W 24/04 |
| | | | | 370/329 |
| 2016/0198332 A1* | 7/2016 | Chuang | .......... | H04W 8/005 |
| | | | | 455/411 |
| 2017/0048647 A1 | 2/2017 | Jung et al. | | |

OTHER PUBLICATIONS

International Search Report dated Apr. 3, 2017 in PCT/EP2016/075629 filed on Oct. 25, 2016.
"3rd Generation Partnership Project; Technical Specification Group Services and System Aspects; Study on architecture enhancements to support Proximity-based Services (ProSe) (Release 12)," 3GPP TR 23. 703, V 12.0.0, Feb. 2014, https://www.arib.or.jp/english/html/overview/doc/STD-T63v11_00/5_Appendix/Rel12/23/23703-c00.pdf, retrieved on Dec. 15, 2016, 324 total pages, XP055329411.
"Universal Mobile Telecommunications System (UMTS); LTE; Proximity-based services (ProSe); Stage 2 (3GPP TS 23.303 version 13.4.0 Release 13)," ETSI TS 123 303, V13.4.0, Jul. 2016, Section 5.2.1, pp. 40-41 and Section 5.3, pp. 44-99, 127 total pages.
"Neighbor Awareness Networking Technical Specification," Wi-Fi Alliance, Version 1.0, 2015, pp. 45-47, 98 total pages.

\* cited by examiner

PROXIMITY SERVICE ACCESS IN A MOBILE COMMUNICATION NETWORK

TECHNICAL FIELD

The present invention relates to the field of communication systems and networks. In particular, the present invention relates to a method for accessing a proximity service in a mobile communication network.

BACKGROUND ART

As known, in a mobile communication network, in particular a LTE (Long Term Evolution) mobile communication network, proximity services (ProSE) are services that may be provided by the network operator on the basis of at least two user equipment (UE) being in proximity to each other. The communication network typically comprises a logical function, the ProSe function, which controls the capability of a UE to discover other UEs that are in its proximity and, on the basis of this information, provide and/or receive pre-determined services. These services may be related to business and commercial activities (shops, restaurants, etc.) and the discovery procedure may be used to trigger mobile advertising.

In particular, the direct discovery standardized by 3GPP (3$^{rd}$ Generation Partnership Project) in the technical specification ETSI TS 123 303 v13.4.0 (2016 July), section 5.3, pages 44-99, is the process that allows a UE to detect and identify another UE in proximity using the LTE radio interface, i.e. using E-UTRA (Evolved UMTS Terrestrial Radio Access) radio signals. The direct discovery may comprise two procedures:

- announcing, according to which a UE of a subscriber wanting to provide certain information to UEs in proximity receives from the network (i.e. from the ProSe function) over an LTE traffic channel a bit sequence (ProSe application code) that will be broadcasted by the UE using a E-UTRA radio signal;
- monitoring/reporting, according to which a UE receives from the ProSe Function over an LTE traffic channel a bit sequence (ProSe discovery filter) that allows monitoring pre-determined ProSe application codes transmitted by UEs that are in its proximity. When the UE receives a ProSe application code that matches the discovery filter, the UE reports the matching ProSe application code to the network and the network provides the UE with information (e.g. advertisements) associated with the UE that is transmitting the matching ProSe application code.

Moreover, it is also known that the Wi-Fi Neighbor Awareness Networking (NAN) technology provides a device-to-device (D2D) discovery mechanism, based on the Wi-Fi® technology, for enabling UEs to access proximity services. For instance, these services may be related to social networking, mobile advertising, gaming, dating, etc. This technology allows the so-called "over-the-top" service providers (e.g. Google, Facebook) to use application servers to deliver proximity services to their users across an IP network (e.g. Internet).

SUMMARY OF THE INVENTION

The Applicant has noticed that, up to now, the discovery mechanisms for accessing proximity services according to different radio access technologies, as those described above, are not integrated with each other. In particular, the Applicant has noticed that the discovery mechanism deployed for LTE networks and the discovery mechanism employing the Wi-Fi technology are not integrated with each other.

Therefore, in order to let the UEs discover the same proximity service by using either the LTE E-UTRA radio interface or the Wi-Fi radio interface, different servers in the network and different applications in the UEs need to be deployed. Indeed, the 3GPP ProSe function is able to communicate with a corresponding 3GPP client in a ProSe-enabled UE to authorize performing the discovery and hence to access the proximity services over the E-UTRA radio interface, but it is not able to communicate with the discovery engine (namely, the so called NAN discovery engine) installed in the same UE to authorize performing the discovery and hence to access the same proximity services over the Wi-Fi radio interface. Moreover, as cited above, proximity services over LTE need that pre-determined bit sequences are transmitted over the air, these sequences being associated with the UEs of subscribers enabled to access the proximity services. Also the NAN technology provides for associating a proximity service with a given service ID. Therefore, different bit sequences may be allocated in the network for a same service announced/monitored by the UEs, each one being associated with a respective radio access technology (namely, LTE E-UTRA, and Wi-Fi, according to the scenario described above) that may be used by the UEs to access the proximity service. This situation leads to a significant increase in complexity for the provisioning of the proximity services.

In view of the above, the Applicant has tackled the problem of providing a method for accessing a proximity service in a mobile communication network which allows overcoming at least one of the drawbacks discussed above. In particular, the Applicant has tackled the problem of providing a method for accessing a proximity service in a mobile communication network which allows integrating different discovery mechanisms based on different radio access technologies.

In the following description and in the claims, the expression "access a proximity service" relate to the procedures according to which a UE is enabled to either provide a proximity service to another UE in its proximity or receive a proximity service from another UE in its proximity.

According to a first aspect, the present invention provides a method for accessing a proximity service in a mobile communication network comprising a network module and a user equipment, the user equipment comprising a primary radio interface configured to operate according to a first radio access technology providing connection to the mobile communication network, and at least one secondary radio interface configured to operate according to at least one second radio access technology different from the first radio access technology, the network module being configured to communicate with the user equipment for enabling the user equipment to access the proximity service, the method comprising:

a) sending by the user equipment to the network module a request message comprising a request to access the proximity service;

b) at the network module, generating an answer message adapted to enable access to the proximity service by the user equipment over the primary radio interface; and c) converting the answer message into at least one further answer message adapted to enable access to the proximity service by the user equipment over the at least one secondary radio interface.

Preferably, the method further comprises subscribing by the user equipment to the proximity service within the mobile communication network and providing to the mobile communication network data indicating an availability of the at least one second radio access technology for accessing the proximity service.

Preferably, the request message further comprises data indicating the at least one second radio access technology and the method further comprises, at the network module, checking, on the basis of the data, whether the user equipment is authorized to access the proximity service via the at least one second radio interface.

Preferably, the request message further comprises one or more service identifiers indicating what information the user equipment is interested to announce or monitor for providing or receiving the proximity service.

According to embodiments of the present invention, the answer message comprises one or more service codes to be announced by the user equipment for providing the proximity service over the primary radio interface, the one or more service codes corresponding to the one or more service identifiers, and converting comprises adapting the one or more service codes to generate, for each of the at least one secondary radio interface, one or more respective secondary service codes to be inserted into a respective one of the at least one further answer message, the one or more respective secondary service codes being adapted to be announced over each of the at least one secondary radio interface.

According to other embodiments of the present invention, the answer message comprises one or more service filters to be monitored by the user equipment for receiving the proximity service over the primary radio interface, the one or more service filters corresponding to the one or more service identifiers, and converting comprises adapting the one or more service filters to generate, for each of the at least one secondary radio interface, one or more respective secondary service filters to be inserted into a respective one of the at least one further answer message, the one or more respective secondary service filters being adapted to monitor secondary service codes, associated with the service identifiers, over each of the at least one secondary radio interface.

According to an embodiment of the present invention, converting is performed at the user equipment and the answer message further comprises adaptation information usable by the user equipment for adapting the one or more service codes or filters, the adaptation information indicating a data structure of the one or more service codes.

Preferably, the method further comprises sending by the network module the at least one further answer message to the user equipment in a transport message adapted to be received by the primary radio interface.

Preferably, the method further comprises:
determining, among the primary radio interface and the at least one secondary radio interface, a target radio interface for accessing the proximity service by the user equipment, on the basis of at least one of: a user's profile associated with the user equipment, a location of the user equipment, an actual load condition of the mobile communication network, an availability of radio resources;
and wherein converting comprises converting the answer message into a further answer message adapted to enable access to the proximity service by the user equipment over the target radio interface.

According to an embodiment of the present invention, converting is performed at the user equipment and the answer message further comprises data indicative of the target radio interface.

Preferably, the mobile communication network is a 3GPP LTE mobile communication network, the primary radio interface is a E-UTRA radio interface and the at least one secondary radio interface comprises a Wi-Fi radio interface, and wherein the answer message is a 3GPP discovery response message and the at least one further answer message comprises a Wi-Fi NAN publish message or a Wi-Fi subscribe message.

According to a second aspect, the present invention provides a network module for a mobile communication network, the network module being configured to communicate with a user equipment for enabling the user equipment to access a proximity service within the mobile communication network, the network module being further configured to:
receive from the user equipment a request message comprising a request to access the proximity service; and
generate an answer message adapted to enable access to the proximity service by the user equipment over a primary radio interface of the user equipment configured to operate according to a first radio access technology, the first radio access technology providing connection to the mobile communication network,
the network module further comprising an adaptation function configured to convert the answer message into at least one further answer message adapted to enable access to the proximity service by the user equipment over at least one secondary radio interface of the user equipment configured to operate according to at least one second radio access technology different from the first radio access technology.

Preferably, the mobile communication network is a 3GPP LTE mobile communication network and the network module comprises a 3GPP ProSe function.

According to a third aspect, the present invention provides a mobile communication network comprising a network module as set forth above, wherein the mobile communication network further comprises a radio discovery module configured to determine, among the primary radio interface and the at least one secondary radio interface, a target radio interface for accessing the proximity service by the user equipment, on the basis of at least one of: a user's profile associated with the user equipment, a location of the user equipment, an actual load condition of the mobile communication network, an availability of radio resources.

According to a fourth aspect, the present invention provides a user equipment for a mobile communication network, the user equipment being configured to communicate with a network module of the mobile communication network for being enabled to access a proximity service within the mobile communication network, the user equipment comprising a primary radio interface configured to operate according to a first radio access technology providing connection to the mobile communication network, and at least one secondary radio interface configured to operate according to at least one second radio access technology different from the first radio access technology, the user equipment being further configured to:
send to the network module of the mobile communication network a request message comprising a request to access the proximity service; and
receive from the network module an answer message adapted to enable access to the proximity service by the user equipment over the primary radio interface, the user equipment further comprising an adaptation function configured to convert the answer message into at least one further answer message adapted to enable access to the proximity service by the user equipment over the at least one secondary radio interface.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
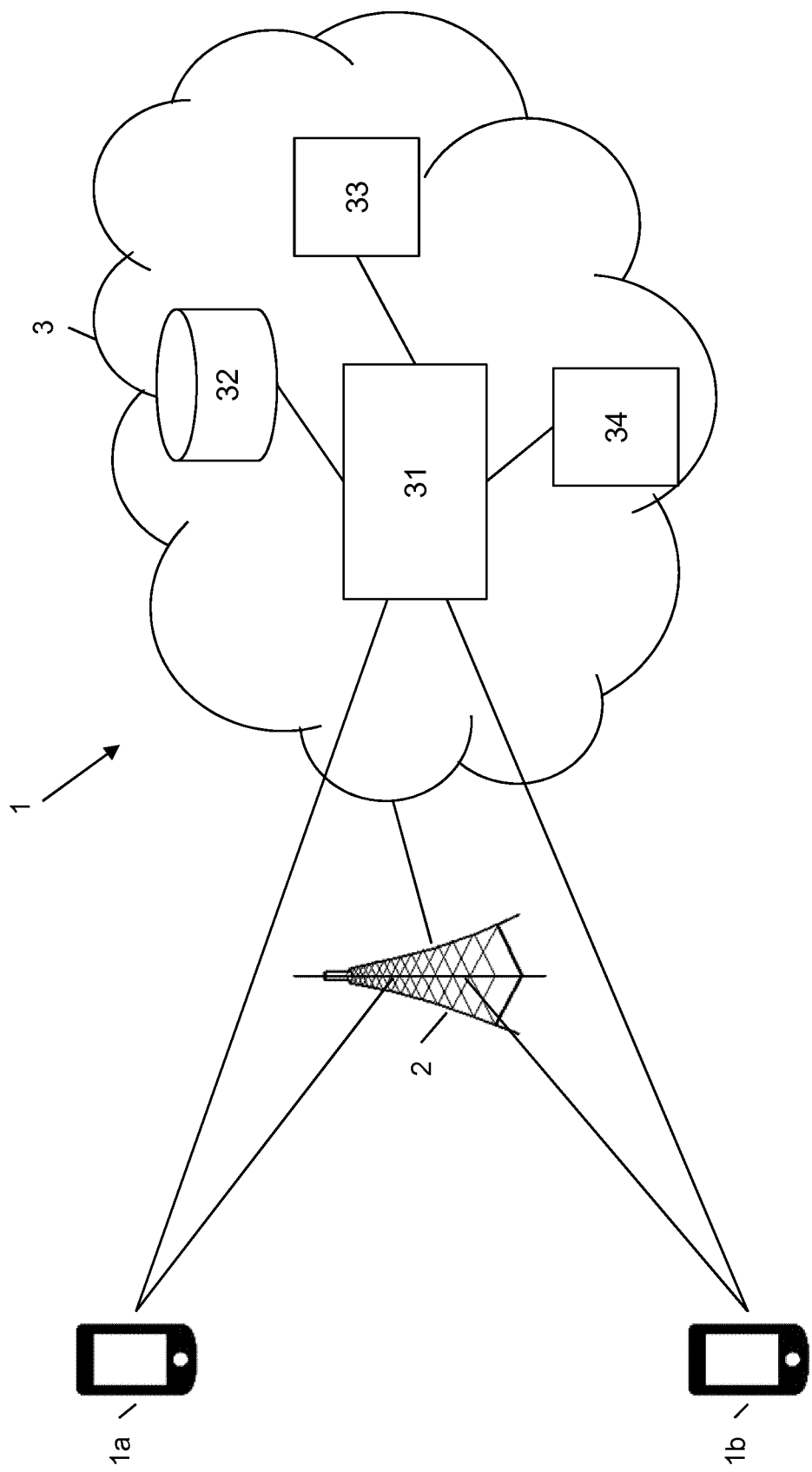
FIG. 1 schematically shows a mobile communication network according to an embodiment of the present invention.

FIG. 1 schematically shows a mobile communication network 1 configured to implement the method according to the present invention. The mobile communication network preferably comprises a number of user equipment (UEs) 1a, 1b, a radio access network 2 and a core network 3. FIG. 1 shows, for sake of example, two UEs 1a, 1b connected to the radio access network 2.

The mobile communication network 1 is preferably configured to support provisioning of a proximity service to network users having subscribed to the proximity service.

Preferably, the UEs 1a, 1b are enabled to support proximity service requirements and associated procedures. In particular, each UE has the capability to run at least one proximity service application on it, the proximity service application enabling the UE to discover other UEs in proximity, to be discovered by other UEs in proximity, and to communicate with the discovered UEs.

Preferably, in addition to the radio interface used to connect the UEs 1a, 1b to the radio access network 2 of the mobile communication network 1, each UE 1a, 1b further comprises a number of other radio interfaces for exploiting other radio access technologies for accessing the proximity service, as it will be better described herein after.

Preferably, the core network 3 comprises a first network module 31 configured to perform the network-related actions required for the proximity service provisioning and management and in particular to control the capability of UEs to access the proximity service. The network module 31 is preferably installed in a core network node.

Moreover, preferably, the core network 3 comprises a second network module 32 (e.g. hosted on a network server) comprising a data repository containing network users' information (such as users' identification and profile information). The core network 3 further comprises a third network module 33 (e.g. hosted on a network server) configured to provide location information of the UEs, and a fourth network module 34 (e.g. hosted on a network server) configured to manage the mobile communication network by performing activities related to, e.g., network configuration and fault management.

The network modules introduced above are connected to the first network module 31. They are preferably implemented as software modules configured to run over a dedicated hardware at the nodes or servers of the mobile communication network.

For instance, the mobile communication network may be a 3GPP's LTE (Long Term Evolution) or LTE-advanced communication network, comprising an evolved UMTS terrestrial radio access network (E-UTRAN) 2 and an evolved packet core (EPC) network 3. The E-UTRAN comprises a number of eNodeBs connecting the UEs to the core network. In this exemplary scenario, FIG. 1 shows an eNodeB 2 connecting the UEs 1a, 1b to the EPC 3. The EPC of the LTE mobile communication network comprises a ProSe (Proximity Services) function 31, which, as already anticipated herein above, is a logical function configured to perform the network-related actions required for the proximity service provisioning and management and in particular to control the capability of UEs to access the proximity services. The ProSe function 31 is preferably implemented at a network node connected to the UEs, as shown in FIG. 1. Moreover, the EPC 3 comprises a home subscriber server (HSS) 32, which is configured to manage network users' information. This information comprises user's identification information, such as the IMSI (International Mobile Subscriber Identity) and MSISDN (Mobile Subscriber ISDN Number) or mobile telephone number, and user's profile information, comprising service subscription states. Furthermore, the EPC comprises a secure user plane location platform (SLP) 33, which is configured to obtain and provide location information of the UEs. Finally, the LTE communication network comprises an operations support system (OSS) 34, which is configured to manage the LTE communication network and to provide information indicating, for instance, the actual load of the LTE communication network.

In the following description, for sake of not limiting example, reference will be made to the LTE mobile communication network and its related architecture and procedures as reported above.

Each UE 1a, 1b communicates with the radio access network 2 of the mobile communication network 1 via a corresponding radio interface, which will be indicated in the present description as "primary radio interface of the UE" or "first radio interface R1". In the exemplary LTE mobile communication network, in particular, each UE 1a, 1b communicates with the E-UTRAN 2 via a E-UTRA radio interface. Preferably, as cited above, in addition to the first radio interface R1 used to connect the UE to the mobile communication network, the UE further comprises a number N−1 (N being an integer number higher than or equal to 1) of other radio interfaces for exploiting further radio access technologies for accessing proximity services. These radio interfaces will be indicated as "second radio interface R2", "third radio interface R3", "N-th radio interface RN" etc. Globally, they will be indicated also as "secondary radio interfaces of the UE". The further radio access technologies may comprise one or more of: 4G/5G radio access technologies other than E-UTRA operating over licensed or unlicensed radio frequency bands (e.g. the unlicensed LTE radio access, also indicated as LTE-U), Wi-Fi, Bluetooth. Moreover, the UE preferably comprises, for each supported radio access technology, a discovery engine associated with the related radio interface, for implementing a discovery procedure over the related radio interface. For instance, the UE may comprise a Wi-Fi radio interface and a Wi-Fi NAN discovery engine for implementing the Neighbor Awareness Networking (NAN) technology.

As already discussed above, a UE wishing to access the proximity service provided within the mobile communication network, shall subscribe to this service with the network operator and, once authorized, perform a discovery procedure aimed at detecting and identifying other UEs in proximity. An exemplary proximity service may consist in providing mobile advertising to the network users about a commercial activity such as a restaurant when the users come in the vicinity of the restaurant. According to the present invention, an "announcing" UE 1a performs a discovery procedure when it announces certain information (by transmitting one or more given codes) that could be used by other UEs in proximity, and a "monitoring" UE 1b performs a discovery procedure when it monitors certain information of interest (by detecting the one or more given codes) in proximity of an announcing UE 1a.

In an LTE mobile communication network, if an announcing UE 1a is authorized, it sends a discovery request message for announcing to the ProSe function 31, via the E-UTRA radio interface. If the request is successful, the UE 1a is provided with a ProSe application code that is then broadcasted by the announcing UE 1a. The monitoring UE 1b, if it is authorized, sends a discovery request message for monitoring to the ProSe function 31, via the E-UTRA radio interface. If the request is successful, the UE 1b is provided with a ProSe discovery filter allowing the UE 1b to monitor one or more ProSe application code(s). When the monitoring UE 1b detects that one or more ProSe application codes match the ProSe discovery filter, it reports the codes to the ProSe function 31. The discovery procedure and other discovery-related procedures within an LTE mobile communication network are standardized by 3GPP ($3^{rd}$ Generation Partnership Project) in the technical specification ETSI TS 123 303 v13.4.0 (2016 July), section 5.3, pages 44-99 (ProSe Direct Discovery). In the following description, the method of the present invention will be described by making reference, for sake of not limiting example, to this procedure.

In the following description, the method for accessing a proximity service in a mobile communication network according to the present invention will be described in greater detail.

Firstly, an announcing UE 1a, as well as a monitoring UE 1b, subscribes to the proximity service with the network operator in order to be authorized to perform a discovery procedure within the considered mobile communication network 1. According to the present invention, when the UE, either the announcing UE 1a or the monitoring UE 1b, subscribes to the proximity service with the network operator, a set of subscription information is stored in the second network module 32 among the user's profile information. This subscription information allow the first network module 31 to give the UE 1a, 1b authorization to access the proximity service, as it will be described herein after. Upon subscribing to the proximity service, the UE 1a, 1b also communicates to the mobile communication network 1 the further radio access technologies (namely the radio access technologies supported by the UE 1a, 1b other than the mobile communication network radio access technology) that the UE 1a, 1b may use for accessing the proximity service. This further information is preferably stored in the second network module 32 as part of the subscription information of the user. For instance, if the UE 1a, 1b has a Wi-Fi interface over which it can access the proximity service, upon subscribing to the proximity service, it may communicate to the mobile communication network 1 that its Wi-Fi interface is available for accessing the proximity service. Before starting a discovery procedure in relation to the considered proximity service, the UE 1a, 1b preferably gets the service authorization from the first network module 31 through interaction with the second network module 32 which stores the user's profile. In an LTE network, the procedure according to which a UE gets the service authorization from the ProSe function is described in the technical specification ETSI TS 123 303 v13.4.0 (2016 July), section 5.2.1, pages 40-41. According to this procedure, the ProSe function gets the subscription information of the UE from the HSS and pre-configures the UE with authorization information for the mobile communication network where the UE is authorized to perform a discovery procedure.

Moreover, the UE 1a, 1b shall be configured to run the proximity service application to trigger the communication with the first network module 31.

Figure 2:
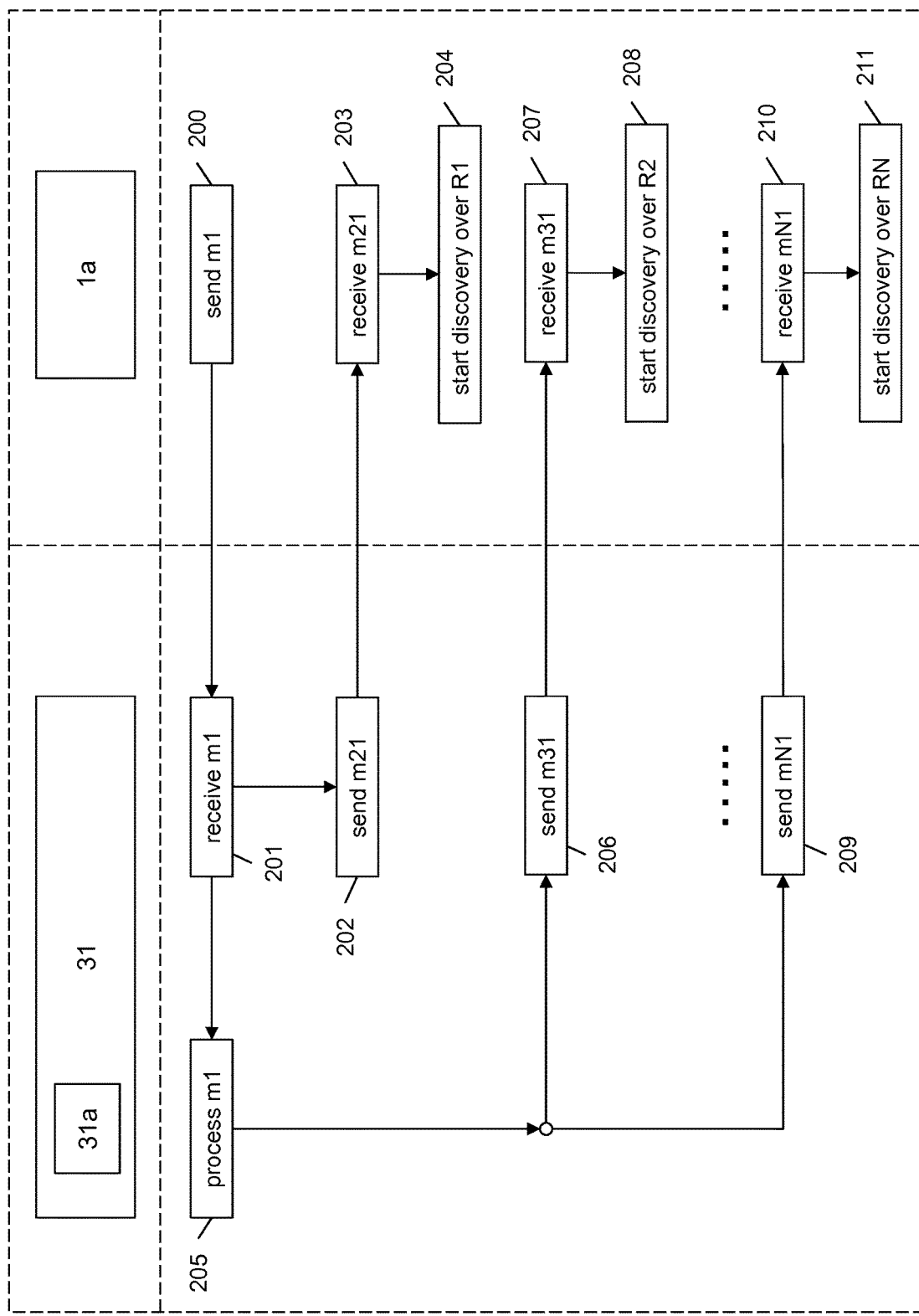
FIG. 2 is a flowchart illustrating the method according to a first embodiment of the present invention.

FIG. 2 is a flowchart of the method according to a first embodiment of the present invention. According to this first embodiment of the present invention, the first network module 31 comprises an adaptation function 31a. The adaptation function 31a may be a software sub-module configured to run over a dedicated hardware at the node of the mobile communication network 1 hosting the first network module 31.

When, for instance, the announcing UE 1a wishes to start announcing, it operates the proximity service application and sends a message m1 to the first network module 31 (step 200) indicating that it wishes to start announcing. The message m1 is sent by the announcing UE 1a through its primary radio interface R1. For instance, as already cited above, the UE 1a may be interested to mobile advertising and to announce offers and discounts of a restaurant to other UEs in the proximity of the restaurant. The message m1 preferably comprises an indication of what the UE 1a is interested to announce (represented by at least one given service identifier), a UE identity, e.g. the IMSI, a command indicating that the UE 1a wishes to announce and an identifier of the application that has triggered the transmission of the message m1. The service identifier(s) may be provided to the UE 1a by the network operator upon subscribing to the proximity service.

Moreover, preferably, the message m1 comprises, in a dedicated field, data indicating the further radio access technologies that the UE 1a may exploit for accessing the proximity service. As already mentioned above, these further radio access technologies may comprise any radio access technology operating over licensed or unlicensed radio frequency bands, e.g., LTE-U, Wi-Fi, Bluetooth, 5G.

In the exemplary LTE mobile communication network considered throughout this description, the message m1 is formatted as a Discovery Request message (as described in the technical specification ETSI TS 123 303 v13.4.0 (2016 July), for instance in section 5.3.3.2, page 49). The Discovery Request message comprises the following fields:

ProSe application ID, which indicates what the UE is interested to announce, in the form of a data structure comprising a number of labels related to, e.g., a broad-level business category, a business sub-category, a business name and a shop ID;

UE identity, which is, e.g., the IMSI;

announce command;

Application ID, which is a unique identifier of the UE application that has triggered the transmission of the Discovery Request message;

Discovery Entry ID, which indicates whether the request is new.

Moreover, according to the present invention, the Discovery Request message comprises an additional field containing data indicating the further radio access technologies supported by the UE 1a.

At step 201, the first network module 31 receives the message m1 and preferably processes it in order to check if the discovery request is authorized, i.e. to check if the UE 1a is authorized to access the proximity service within the mobile communication network 1 over its primary radio interface R1. If the discovery request is authorized, at step 202, the first network module 31 preferably sends a first answer message m21 to the UE 1a, in particular, to the primary radio interface R1 of the UE 1a. The first answer message m21 is preferably provided by the first network module 31 to authorize the UE 1a to start the discovery procedure over its primary interface R1 and to provide the UE 1a with at least one service code, associated with the service identifier(s) sent by the UE 1a, which the UE 1a shall announce. The service codes are preferably determined by the first network module 31.

Within the exemplary LTE mobile communication network considered throughout this description, the first answer message m21 is sent from the first network module 31 to the E-UTRA radio interface of the announcing UE 1a, the first answer message m21 being formatted as a Discovery Response message. The Discovery Response message is described in the technical specification ETSI TS 123 303 v13.4.0 (2016 July), for instance in section 5.3.3.2, page 50. The Discovery Response message comprises service codes in the form of one or more ProSe application codes, which correspond to the one or more ProSe application IDs that are contained in the Discovery Request message.

At step 203, the UE receives the first answer message m21 and at step 204 it may start the discovery procedure over the primary radio interface R1 by announcing the received service code(s).

Moreover, the first network module 31 forwards the discovery request message m1 and the first answer message m21 to the adaptation function 31a. Preferably, the adaptation function 31a processes the message m1 by retrieving from the dedicated field the data indicating the further radio access technologies supported by the announcing UE 1a (step 205). Then, the adaptation function 31a preferably cooperates with the first network module 31 in order to check whether the UE 1a is authorized to access the proximity service over these further supported radio access technologies. In particular, the adaptation function 31a preferably cooperates with the first network module 31 to interrogate the second network module 32 in order to determine whether the user's subscription data contain an indication that the UE 1a supports the radio access technologies indicated in the dedicated field of the message m1. If the service subscription data contain the information that the UE 1a supports a given radio access technology, the UE 1a may be authorized to use that radio access technology to access the proximity service over the corresponding secondary radio interface.

Then preferably, the adaptation function 31a converts the first answer message m21 into a number of further answer messages, this number being equal to the number of secondary radio interfaces supported by the UE 1a and which the UE 1a is authorized to use to access the proximity service. Each further answer message is preferably compatible with one respective discovery engine associated with a secondary radio interface R2, R3, . . . , RN supported by the UE 1a and which the UE 1a is authorized to use to access the proximity service. Throughout this description, the expression "answer message compatible with a discovery engine" relates to a message whose structure and content are adapted to be understood by the considered discovery engine. The content of a further answer message is further clarified herein after.

In particular, starting from the first answer message m21, the adaptation function 31a preferably generates, for each authorized secondary radio interface R2, . . . , RN supported by the UE 1a, one appropriate answer message that the discovery engine associated with the authorized secondary radio interface may process to start the relevant discovery procedure over the authorized secondary radio interface. More in particular, the adaptation function 31a, for each authorized secondary radio interface R2, . . . , RN supported by the UE 1a, preferably adapts the service code(s) comprised in one or more field(s) of the first answer message m21 to generate secondary service code(s) adapted to be carried in the respective further answer message. The secondary service codes(s) generated for a given authorized secondary radio interface allow the discovery engine associated with the authorized secondary radio interface of the UE 1a to start the relevant discovery procedure and are hence adapted to be announced via the authorized secondary radio interface for the provisioning of the considered proximity service.

In particular, if the UE is authorized to use the second radio interface R2, the adaptation function 31a preferably converts the first answer message m21 into a second answer message m31 preferably adapted to be processed by the discovery engine installed in the UE 1a to perform the discovery procedure over the second radio interface R2.

For instance, the second answer message m31 may be a message adapted to be processed by the Wi-Fi NAN discovery engine of the UE 1a. The second answer message m31 may be formatted according to the Publish method, as described in the "Neighbor Awareness Networking Technical Specification", Version 1.0, by Wi-Fi Alliance, 2015, page 45. With this method, a service/application makes a service discoverable with given parameters for other Wi-Fi NAN devices by publishing it. In this case, the second answer message m31 (also indicated herein below as Publish message) comprises the following parameters:

service_name, which is an identifier of the service/application;

matching_filter_tx, which is an ordered sequence of <length, value> pairs to be included in the discovery frame;

matching_filter_rx, which is an ordered sequence of <length, value> which specify further response conditions beyond the service name used to filter subscribe messages to respond to;

service_specific_info, which is a sequence of values which should be conveyed to the discovery engine of a Wi-Fi NAN device that has invoked a Subscribe method corresponding to this Publish method;

configuration_parameters, comprising:
  Publish type (solicited transmissions, unsolicited transmissions, both unsolicited and solicited transmissions);
  discovery range, which determines whether the service is made discoverable in close proximity only or to any Wi-Fi NAN devices within range;
  solicited transmission type (unicast or multicast transmission);

announcement period, which represents a recommended periodicity of unsolicited transmissions;

time to live, which indicates whether the instance of the Publish function is to run for a given time interval or for one transmission only;

event conditions, which determines when Publish related events are generated;

matching filter flag, which is equal to 0 if matching_filter_tx is equal to matching_filter_rx, and 1 if matching_filter_tx is not equal to matching_filter_rx.

In this case, considering the exemplary LTE mobile communication network, the adaptation function 31a adapts the one or more ProSe application codes provided by the ProSe function in response to the Discovery Request message to generate secondary service codes in the form of data strings corresponding to these codes, these data strings being adapted to be carried in the Publish message in one or more matching_filter_tx fields. For instance, a ProSe application code may be segmented and each segment may correspond to a respective label of the ProSe application ID associated with the ProSe application code. In this exemplary situation, the adaptation function 31a may then determine which segments of the ProSe application code shall be put into the matching_filter_tx fields of the Publish message on the basis of which type of information (e.g. broad-level business category and/or business sub-category and/or business name and/or shop ID) shall be announced via the Wi-Fi radio interface of the UE 1a. Each selected segment may then be inserted into a respective matching_filter_tx field. Alternatively, the Publish message may carry the secondary service codes in one or more dedicated additional fields.

At step 206, the first network module 31 preferably encapsulates the second answer message m31 into a transport message adapted to the carried over the link of the mobile communication network 1 connecting the first network module 31a nd the UE 1a. Then, it sends the second answer message m31 (as encapsulated into the appropriate transport message) to the UE 1a, in particular to the primary radio interface R1 of the UE1a. The UE1a then receives the transport message, retrieves the second answer message m31 (step 207) and forwards it to the relevant discovery engine that may start a discovery procedure over the second radio interface R2 (step 208) by announcing the received secondary service code(s). The discovery procedure over the second radio interface R2 may be started by the UE 1a in place of or simultaneously with respect to a discovery procedure possibly started over the first radio interface R1.

The same actions described above are preferably performed for each secondary radio interface of the UE 1a supporting access to the proximity service, and over which the UE 1a is authorized to access the proximity service, as already described above. With reference to the flowchart of FIG. 2, if the UE 1a is authorized to use all its secondary radio interfaces, the adaptation function 31a may finally generate a N-th answer message mN1 containing the appropriate secondary service code(s). The N-th answer message mN1 is preferably adapted to be processed by the discovery engine installed at the UE 1a which is adapted to perform the discovery procedure over the N-th radio interface RN. In particular, the N-th answer message mN1 preferably comprises secondary service code(s) adapted to be announced over the N-th radio interface RN. At step 209, the first network module 31 preferably sends the N-th answer message mN1 to the UE 1a as encapsulated into the appropriate transport message, which receives it via the primary radio interface R1 (step 210) and may start a discovery procedure over the N-th radio interface RN by announcing the received secondary service code(s).

According to a variant of the first embodiment described above, not shown in the Figures, similarly to what has been already described, upon reception of the message m1, the first network module 31 preferably checks the authorization of the UE 1a to access the proximity service over the primary radio interface R1 and the adaptation function 31a preferably cooperates with the primary network module 31 to check whether the UE 1a is authorized to access the proximity service over its secondary radio interfaces R2, . . . , RN indicated in the message m1, by checking the subscription information at the second network module 32 (namely, within the exemplary LTE mobile communication network considered in this description, the HSS). Moreover according to this variant, the adaptation function 31a cooperates with the first network module 31 to interrogate the third network module 33 (namely, within the exemplary LTE mobile communication network considered in this description, the SLP) in order to obtain location information of the UE 1a. Then, preferably, the adaptation function 31a determines a target radio interface RT to be used by the announcing UE 1a to access the proximity service among all the radio interfaces R1, . . . , RN that are authorized to access to the proximity service (namely, among the primary radio interface and the secondary radio interfaces, if authorized). This determination is preferably performed on the basis of the location information of the UE 1a retrieved from the second network module 33. For instance, the adaptation function 31a may be pre-configured to determine that, in case the UE 1a is located in an indoor environment (such as, for instance, a shopping mall), the target radio interface RT is a secondary radio interface such as a Wi-Fi radio interface, otherwise the target radio interface RT is the primary radio interface R1.

At this point, the adaptation function 31a preferably generates one answer message compatible with the target radio interface RT and sends the answer message to the UE 1a (possibly, in an appropriate transport message), which may then start a discovery procedure over the target radio interface RT by announcing the received code(s) (according to the language used throughout this description, the received code(s) are the service code(s) if the target radio interface RT is the primary radio interface R1 or the secondary service code(s) if the target radio interface RT is a secondary radio interface).

It is to be noticed that the method above, with reference to the first embodiment of the present invention and its variant, has been described by making reference to an announcing UE 1a whishing to access the proximity service, However, it applies in substantially the same manner to the discovery procedure that may be started by a monitoring UE 1b wishing to access the proximity service. In this case:

the message m1 sent by the monitoring UE 1b to the first network module 31 indicates what the UE is interested to monitor (represented by at least one given service identifier), contains a command indicating that the UE 1b wishes to monitor and data indicating the further radio access technologies supported by the UE 1b to access the proximity service;

in case the UE 1b is authorized to monitor the considered proximity service over the primary radio interface R1, the first answer message m21 comprises at least one service filter for monitoring the service codes(s) associated with the service identifier(s) sent by the monitoring UE 1b; and in case the UE 1*b* is authorized to monitor the proximity service over a secondary radio interface, for instance the second radio interface R2, the second answer message m31 is preferably adapted to be processed by the discovery engine installed in the UE 1*b* to perform the discovery procedure over the second radio interface R2. In particular, the adaptation function 31*a* preferably generates secondary service filter(s) that are adapted to be carried in the second answer message m31. The secondary service filter(s) generated for the second radio interface R2 are adapted to monitor, over the second radio interface R2, the secondary service code(s) associated with the service identifier(s) sent by the monitoring UE 1*b*, as it will be clearer from the following example.

Within the exemplary LTE mobile communication network considered in this description, the message m1 sent by the monitoring UE 1*b* may be formatted as a Discovery Request message, as described in in the technical specification ETSI TS 123 303 v13.4.0 (2016 July), for instance in section 5.3.3.4, page 59. It comprises the following fields:

ProSe application ID, which indicates what the UE is interested to monitor, in the form of a data structure comprising, e.g., a broad-level business category, a business sub-category, a business name and a shop ID;

UE identity, which is, e.g., the IMSI;

monitor command;

Application ID, which is a unique identifier of the UE application that has triggered the transmission of the Discovery Request message;

Discovery Entry ID, which indicates whether this is a new request.

Moreover, according to the present invention, the Discovery Request message comprises an additional field containing data indicating the further radio access technologies supported by the monitoring UE 1*b*.

Besides, the first answer message m21 may be formatted as a Discovery Response message, as described in in the technical specification ETSI TS 123 303 v13.4.0 (2016 July), for instance in section 5.3.3.4, page 60. The Discovery Response message comprises one or more ProSe discovery filters.

Furthermore, if the second radio interface R2 is a Wi-Fi radio interface, the second answer message m31 may be a message adapted to be processed by the Wi-Fi NAN discovery engine of the UE 1*b*, in particular it may be formatted according to the Subscribe method, as described in the "Neighbor Awareness Networking Technical Specification", Version 1.0, by Wi-Fi Alliance, 2015, pages 46 and 47. With the Subscribe method, a service/application makes the Wi-Fi NAN discovery engine to search for a service with given parameters from other Wi-Fi NAN devices. In this case, the second answer message m31 (also indicated herein below as Subscribe message) comprises the following parameters:

service_name, which is an identifier of the service/application;

matching_filter_rx, which is an ordered sequence of <length, value> pairs used to filter out received publish discovery messages containing the service name;

matching_filter_tx, which is an ordered sequence of <length, value> pairs included beyond the service name when active subscription is used that are included in the discovery frame;

service_specific_info, which is a sequence of values which further specify the published service beyond the service name;

configuration_parameters, comprising:

Subscribe type (active, passive);

discovery range, which determines whether the service is searched in close proximity only or in any Wi-Fi NAN devices within range;

query period, which is a recommended periodicity of query transmissions;

time to live, which indicates whether the instance of the Subscribe function is to run for a given time interval or until the first DiscoveryResult event;

matching filter flag, which is equal to 0 if matching_filter_tx is equal to matching_filter_rx, and 1 if matching_filter_tx is not equal to matching_filter_rx.

In this case, the adaptation function 31*a* adapts the one or more ProSe application codes provided by the ProSe function in response to the Discovery Request message to generate secondary service filters in the form of data strings corresponding to these codes, these data strings being adapted to be carried in the Subscribe message in one or more matching_filter_rx fields. For instance, each ProSe application code may be segmented and each segment may correspond to a respective label of the ProSe application ID associated with the ProSe application code. Then, in this exemplary situation, the adaptation function 31*a* may determine which segments of the ProSe application code shall be put into the matching_filter_rx fields of the Subscribe message on the basis of which type of information (e.g. broad-level business category and/or business sub-category and/or business name and/or shop ID) shall be monitored via the Wi-Fi radio interface of the UE 1*b*. Each selected segments may then be inserted into a respective matching_filter_rx field. Alternatively, the Subscribe message may carry the secondary service filters in one or more dedicated additional fields.

Figure 3:
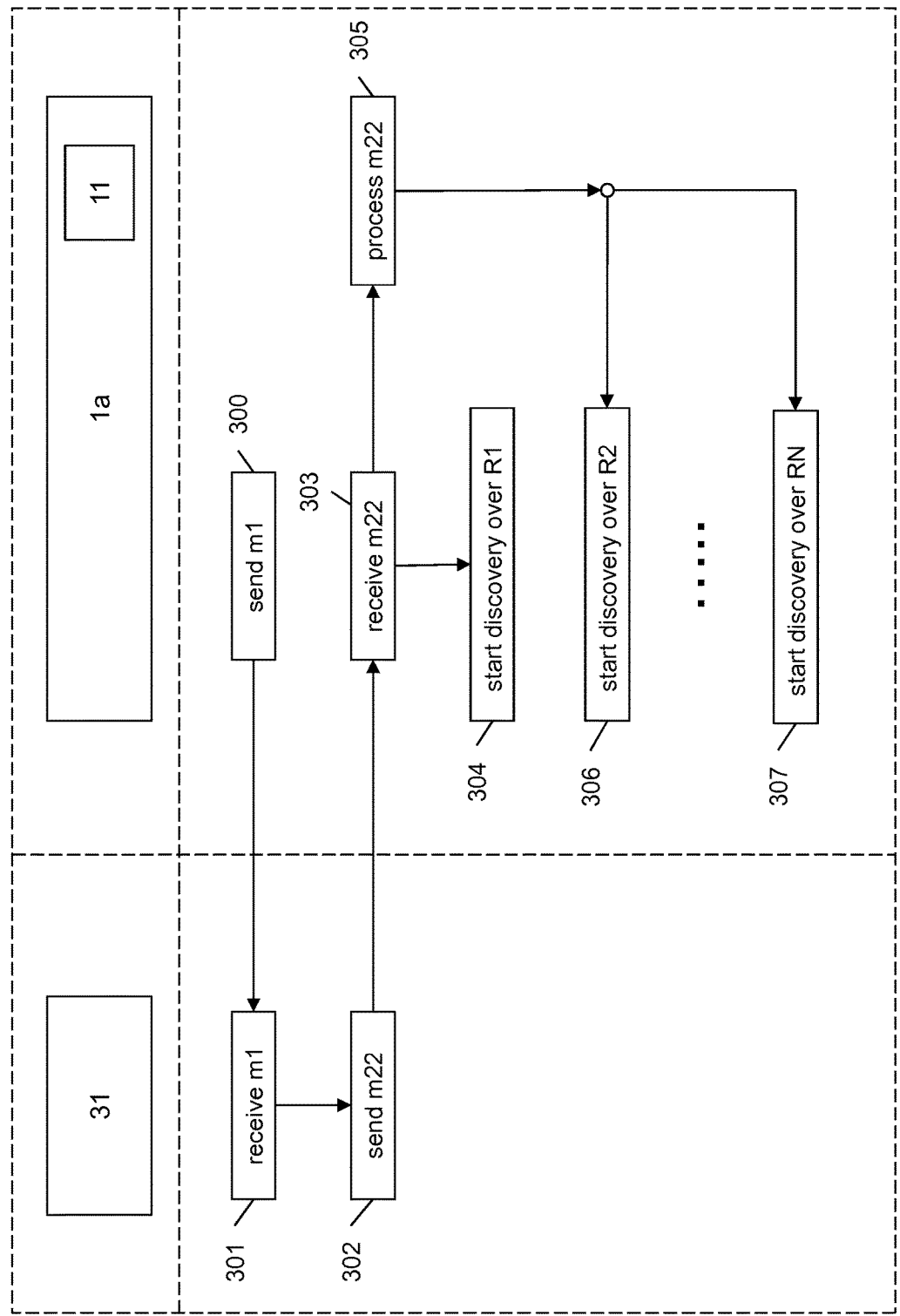
FIG. 3 is a flowchart illustrating the method according to a second embodiment of the present invention.

FIG. 3 is a flowchart of the method according to a second embodiment of the present invention. According to the second embodiment of the present invention, the UE 1*a* comprises an adaptation function 11 installed on it. The adaptation function may be a software module configured to run over a dedicated hardware at the user equipment.

As already described above with reference to the flow chart of FIG. 2, when, for instance, the announcing UE 1*a* wishes to start announcing, it sends the message m1 to the first network module 31 (step 300) via its first radio interface R1. This message is formatted as already described above with reference to the flowchart of FIG. 2. In particular, the message m1 comprises a field containing data indicating the radio access technologies supported by the UE 1*a* to access the proximity service other than the mobile network radio access technology.

At step 301, the first network module 31 receives the message m1 and processes it in order to check if the discovery request is authorized.

Moreover, the first network module 31 preferably checks whether the UE 1*a* is authorized to use the further radio access technologies indicated in the message m1. Checking is preferably performed by interrogating the second network module 32 and retrieving the subscription information, as already described above with reference to the first embodiment.

If the discovery request is authorized, at step 302, the first network module 31 preferably sends an answer message m22 to the primary radio interface R1 of the UE 1*a*. The answer message m22 is provided by the mobile communication network 1 to authorize the UE 1*a* to start one or more discovery procedures over the authorized radio interfaces and to provide the UE 1*a* with at least one service code to be announced, associated with the service identifier(s) sent by the UE. Moreover, the answer message m22 preferably comprises a field comprising data indicative of the authorized secondary radio interfaces R2, . . . , RN of the UE 1a supporting access to the proximity service, over which a discovery procedure may start.

Besides, according to this second embodiment of the present invention, the answer message m22 preferably comprises adaptation information, which are information needed by the adaptation function 11 to convert the answer message m22 into one or more secondary answer messages preferably adapted to be processed by the discovery engine(s) installed in the UE 1a to perform the discovery procedure over the authorized secondary radio interfaces R2, . . . , RN, as it will be better described in detail herein after.

At step 303, the UE 1a receives the answer message m22 and processes it. At step 304, the UE 1a may start the discovery procedure over the primary radio interface R1 by announcing the received service code(s).

The UE 1a then preferably forwards the answer message m22 to the adaptation function 11. According to this second embodiment, the adaptation function 11 installed in the UE 1a preferably processes the answer message m22, retrieves from it the data indicative of the authorized secondary radio interfaces R2, . . . , RN of the UE 1a supporting access to the proximity service and retrieves the adaptation information. Then, on the basis of the adaptation information, it converts the answer message m22 into further answer messages that are compatible with the discovery engines associated with the authorized secondary radio interfaces R2, . . . , RN (step 305). In other words, the adaptation function 11 preferably converts the answer message m22 into further answer messages that are adapted to activate the discovery procedures over the authorized secondary radio interfaces R2, . . . , RN of the UE 1a.

Within the exemplary LTE mobile communication network considered throughout this description, the answer message m22 is sent from the first network module 31 to the E-UTRA radio interface of the announcing UE 1a, the answer message m22 being formatted as a Discovery Response message comprising the ProSe application code(s) that the UE 1a shall announce. In case one of the authorized secondary radio interfaces is the Wi-Fi radio interface of the UE 1a, the Discovery Response message is adapted to comprise (e.g. in an additional field) adaptation information that indicate the data structure of the ProSe application code(s), such adaptation information allowing the adaptation function 11 to adapt each ProSe application code to be inserted into one or more matching_filter_tx fields of a Publish message. In this exemplary situation, the adaptation function 11, on the basis of the adaptation information, may determine which segments of the ProSe application code shall be put into the matching_filter_tx fields of the Publish message on the basis of which type of information (e.g. broad-level business category and/or business sub-category and/or business name and/or shop ID) shall be announced via the Wi-Fi radio interface of the UE 1a.

After processing of the answer message m22 as described above, the UE 1a may start a discovery procedure over each secondary radio interface which is available at the UE 1a and which is authorized to access the proximity service, by announcing the secondary service code(s) contained in the respective further answer message. The flowchart of FIG. 3 shows, for instance, that a discovery procedure starts over each secondary interface R2, . . . , RN of the UE 1a, in particular at step 306 over the second radio interface R2 and at step 307 over the N-th radio interface RN. Activation of the discovery procedure over a radio interface may be performed in place of or substantially simultaneously with respect to the activation of the discovery procedure over any other radio interface.

Also in this case, it is to be noticed that the method described above with reference to the second embodiment of the present invention applies in substantially the same manner to the discovery procedure that may be started by a monitoring UE 1b, as already described above with reference to the first embodiment of the present invention.

According to a variant of the second embodiment of the present invention, not shown in the Figures, similarly to what has been described above, the first network module 31 preferably provides the authorization to the UE 1a to access the proximity service over the primary radio interface R1a nd it also preferably checks whether the UE 1a is authorized to access the proximity service over the secondary radio interfaces R2, . . . , RN indicated in the message m1, by checking the subscription information at the second network module 32. Moreover, according to this variant, the first network module 31 also interrogates the third network module 33 in order to obtain location information of the UE 1a. Then, preferably, the first network module 31 determines a target radio interface RT to be used by the announcing UE 1a to access the proximity service among the radio interfaces R1, . . . , RN that are authorized to access to the proximity service. This determination is preferably performed on the basis of the location information of the UE 1a retrieved from the second network module 33, as already described above. At this point, the first network module 31 preferably generates and sends to the UE 1a an answer message, which is formatted in the same manner as the answer message m22 already described above with reference to the second embodiment of the present invention, preferably comprising additional data indicating the target radio interface RT of the UE 1a. The UE 1a receives the answer message via the primary radio interface R1 and, if the target radio interface RT is the primary radio interfaces R1, it may start the discovery procedure over the primary radio interface R1. However, if the target radio interface RT is a secondary radio interface, the UE 1a forwards the answer message to the adaptation function 11. The adaptation function 11 preferably converts the answer message into a further answer message compatible with the discovery engine associated with the target radio interface RT so that the UE 1a may start a discovery procedure over the target radio interface RT by announcing the secondary service code(s).

Figure 4:
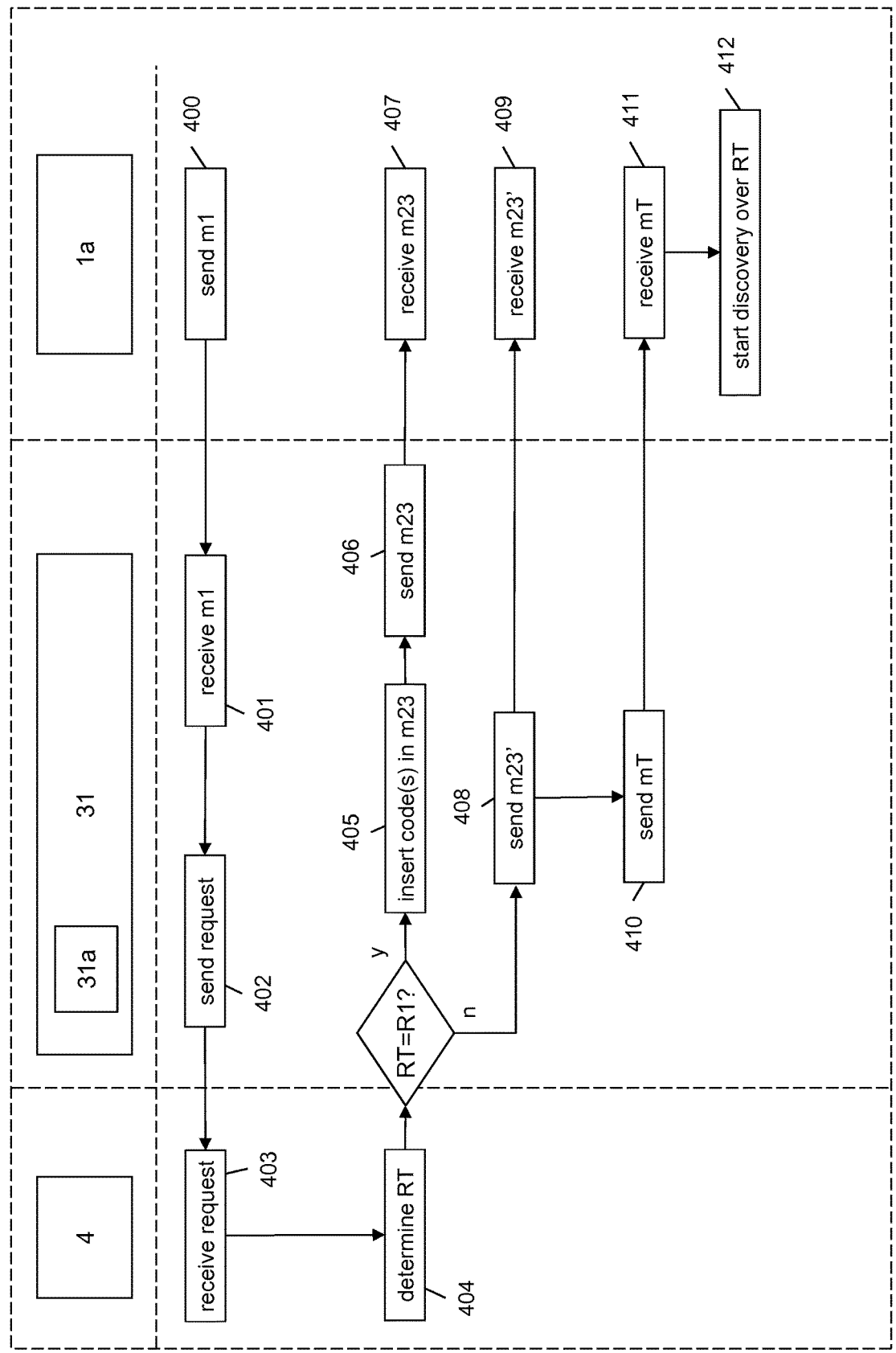
FIG. 4 is a flowchart illustrating the method according to a third embodiment of the present invention.
Figure 5:
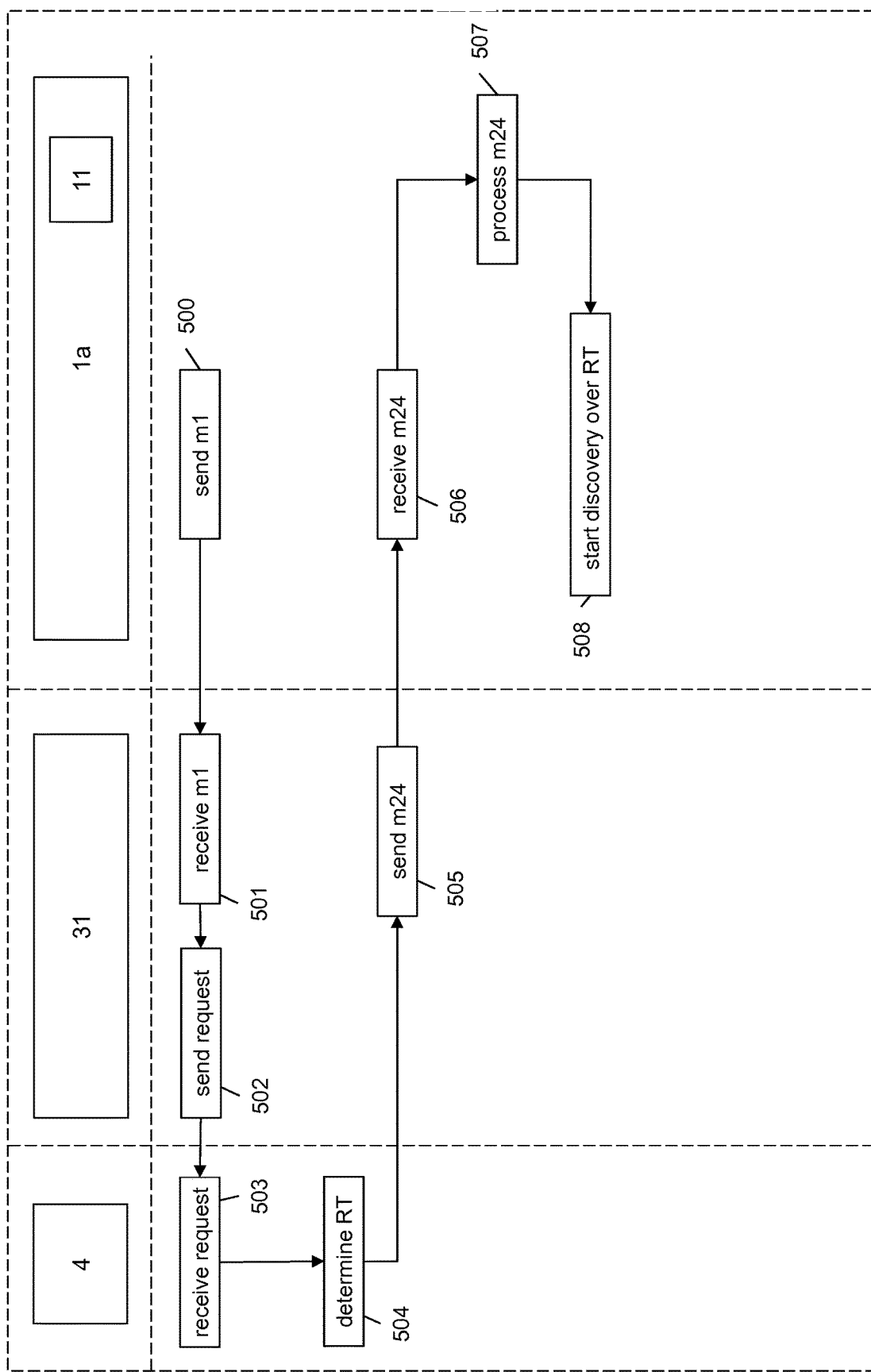
FIG. 5 is a flowchart illustrating the method according to a fourth embodiment of the present invention.

FIGS. 4 and 5 are flowcharts of the method according to a third embodiment and a fourth embodiment of the present invention, respectively. According to the third and fourth embodiments of the present invention, the network node hosting the first network module 31 comprises also a radio discovery control module 4 connected to the first network module 31. It is to be noticed that this is not limiting, as the radio discovery control module 4 may also be hosted on another node of the mobile communication network 1 in communication with the first network module 31. It is preferably implemented as a software module configured to run on a dedicated hardware at the node of the mobile communication network 1.

According to the third embodiment of the present invention, as already described above with reference to the previous embodiments, when, for instance, the announcing UE 1a wishes to start announcing, it sends the message m1 to the first network module 31 (step 400) via its primary radio interface R1. This message is formatted as already described above with reference to the flowcharts of FIGS. 2 and 3. In particular, the message m1 comprises a field containing data indicating the radio access technologies supported by the UE 1a to access the proximity service other than the mobile network radio access technology.

At step 401, the first network module 31 receives the message m1 and processes it in order to check if the discovery request is authorized. In the meanwhile, at step 402, the first network module 31 preferably forwards the message m1 to the adaptation function 31a that processes the message m1 by retrieving the data indicating the further radio access technologies supported by the announcing UE 1a. Moreover, the adaptation function 31a preferably cooperates with the first network module 31 to check whether the UE 1a is authorized to access the proximity service over these further radio access technologies, as already described above with reference to the first and second embodiments of the present invention.

Then, the first network module 31 preferably sends a request to the radio discovery control module 4, such request comprising information about all the radio access technologies supported by the UE 1a and authorized to access the proximity service (namely, the radio access technology of the mobile communication network and/or one or more of the further radio access technologies), and an identifier of the user (step 402).

Upon reception of the request (step 403), preferably, the radio discovery control module 4 employs the user identifier to retrieve information from the second network module 32 (namely, within the exemplary LTE mobile communication network considered in this description, the HSS), from the third network module 33 (namely, within the exemplary LTE mobile communication network considered in this description, the SLP) and from the fourth network module 34 (namely, within the exemplary LTE mobile communication network considered in this description, the OSS), through the first network module 31. Then, on the basis of the retrieved information, the radio discovery control module 4 preferably determines, among the radio interfaces of the UE 1a that are authorized to access the proximity service, a target radio interface RT to be used by the announcing UE 1a to access the proximity service (step 404). Determining the target radio interface RT may be performed on the basis of the user's profile retrieved from the second network module 32 and/or the location of the UE 1a retrieved from the third network module 33 and/or the actual load conditions of the mobile communication network retrieved from the fourth network module 34 and/or the availability of radio resources retrieved from the fourth network module 34. For instance, if the announcing UE 1a is currently located in a shopping mall, the radio discovery control module 4 may determine that the UE 1a may conveniently use its Wi-Fi radio interface.

Then, the radio discovery control module 4 preferably generates and sends to the first network module 31a response indicating the target radio interface RT determined at step 404.

At steps 405 and 406, the first network module 31 preferably generates and sends to the UE 1a a first answer message, which is compatible with the primary radio interface R1. In case the target radio interface RT determined by the radio discovery control module 4 is the primary radio interface RT, the first network module 31 preferably inserts in the first answer message m23 at least one service code to be announced by the UE 1a, associated with the service identifier(s) sent by the UE 1a (step 405). At step 407, the UE la receives the first answer message m23 via its primary radio interface R1 and it may start the discovery procedure over the primary radio interface R1 by announcing the received service code(s).

In case the target radio interface RT determined by the radio discovery control module 4 is not the primary radio interface R1, the first network module 31 preferably sends to the UE 1a an answer message m23' that does not contain any service code (step 408), so that, upon its reception (step 409), the UE 1a may determine that it has not to start any discovery procedure over the primary radio interface R1.

Within the exemplary LTE mobile communication network considered throughout this description, the first answer message m23, m23' is sent from the first network module 31 to the E-UTRA radio interface of the announcing UE, the first answer message m23 being formatted as a Discovery Response message. If the E-UTRA radio interface is the target radio interface determined by the radio discovery control module 4, the Discovery Response message comprises at least one ProSe application code, associated with the Prose application identifier(s) sent by the UE, 1a which the UE 1a shall announce.

If the target radio interface RT is one of the authorized secondary radio interfaces of the UE 1a (e.g. the second radio interface R2, which may be a Wi-Fi radio interface), the first answer message m23' is provided to the adaptation function 31a that preferably converts the first answer message m23' into a further answer message mT (step not shown in FIG. 4). The answer message mT is preferably adapted to be processed by the discovery engine installed in the UE 1a which is associated with the respective secondary radio interface being determined to be the target radio interface RT. In particular, the adaptation function 31a preferably adapts the service code(s) comprised in one or more field(s) of the first answer message m23' to generate secondary service code(s) adapted to be announced by the UE 1a during a discovery procedure over the target radio interface RT.

Within the exemplary LTE mobile communication network considered throughout this description, if the target radio interface RT is the Wi-Fi radio interface of the UE 1a, the second answer message mT is a message adapted to be processed by the Wi-Fi NAN discovery engine (namely, a Publish message) and it may comprise, the ProSe application code(s) to be announced, or segments thereof, into the matching_filter_tx fields, as already described above with reference to the first and second embodiment of the present invention.

At step 410, the first network module 31 preferably encapsulates the further answer message mT into a transport message adapted to be carried over the link of the mobile communication network 1 connecting the first network module (31) and the UE 1a, and sends the transport message to the UE 1a. The UE 1a, upon reception of the further answer message mT (step 411), may start a discovery procedure over the target radio interface RT (step 412) by announcing the received secondary service code(s).

Also in this case, it is to be noticed that the method described above with reference to the third embodiment of the present invention applies substantially in the same manner to the discovery procedure that may be started by a monitoring UE 1b, as already described above.

FIG. 5 is a flowchart of the method according to a fourth embodiment of the present invention.

As already described above, when, for instance, the announcing UE 1a, wishes to start announcing, it sends the message m1 to the first network module 31 through its primary radio interface R1 (step 500). This message has been already described above with reference to the flowcharts of FIGS. 2-4.

At step 501, the first network module 31 receives the message m1 and processes it in order to check if the discovery request is authorized. In the meanwhile, preferably, the first network module 31 processes the message m1 by retrieving the data indicating the other radio access technologies supported by the announcing UE 1a and preferably checks whether the UE 1a is authorized to use these other radio access technologies for accessing the proximity service. Checking is preferably performed by interrogating the second network module 32 and retrieving the subscription information, as already described above with reference to the other embodiments of the present invention.

Then, the first network module 31 preferably sends a request to the radio discovery control module 4, such request comprising information about all the radio access technologies supported by the UE 1a and authorized to access the proximity service, and an identifier of the user (step 502). Upon reception of the request (step 503), preferably, the radio discovery control module 4 employs the user identifier to retrieve information from the second network module 32 (namely, within the exemplary LTE mobile communication network considered in this description, the HSS), from the third network module 33 (namely, within the exemplary LTE mobile communication network considered in this description, the SPL) and from the fourth network module 34 (namely, within the exemplary LTE mobile communication network considered in this description, the OSS), through the first network module 31. Then, on the basis of the retrieved information, the radio discovery control module 4 preferably determines, among the radio interfaces of the UE 1a that are authorized to access the proximity service, a target radio interface RT to be used by the announcing UE 1a to access the proximity service (step 504). Determining the target radio interface RT may be performed on the basis of the user's profile retrieved from the second network module 32 and/or the location of the UE 1a retrieved from the third network module 33 and/or the actual load conditions of the mobile communication network retrieved from the fourth network module 34 and/or the availability of radio resources retrieved from the fourth network module 34.

The radio discovery control module 4 preferably generates and sends to the first network module 31 a response indicating the target radio interface RT which has been determined at step 504.

Then, the first network module 31 preferably generates an answer message m24. The answer message m24 is compatible with the primary radio interface R1a nd carries at least one service code, associated with the service identifier(s) sent by the UE 1a, which the UE 1a shall announce. Moreover, the answer message m24 preferably comprises data indicative of the target radio interface RT which has been determined at step 504, and adaptation information, which are information needed by the adaptation function 11 to convert the answer message m24 into a further answer message preferably adapted to be processed by the discovery engine installed in the UE 1a to perform the discovery procedure over the target radio interface RT. Within the exemplary LTE mobile communication network considered throughout this description, the answer message m24 is formatted as a Discovery Response message and comprises at least one ProSe application code, associated with the ProSe application identifier(s) sent by the UE 1a, which the UE 1a shall announce.

At step 505, the first network module 31 preferably sends the answer message m24 to the UE 1a, which receives it (step 506) and processes it (step 507). If the target radio interface RT comprises the primary radio interface R1 of the UE, the UE may start a discovery procedure over the primary radio interface R1 (step 508) by announcing the received service code(s). If the target radio interface RT does not comprise the primary radio interface R1, the adaptation function 11 installed in the UE preferably converts the answer message m24 into a further answer message compatible with the discovery engine associated with the target radio interface RT of the UE (step 507). The UE may then start a discovery procedure over the target radio interface RT (step 508) by announcing the secondary service code(s) contained in the further answer messages.

Also in this case, it is to be noticed that the method described above with reference to the fourth embodiment of the present invention applies substantially in the same manner to the discovery procedure that may be started by a monitoring UE.

In particular, according to the fourth embodiment of the present invention, a monitoring UE 1b sends to the first network module 31a message m1 indicating the service identifier(s) that the UE 1b wishes to monitor and the other supported radio access technologies. In this case, the radio discovery control module 4 preferably determines the radio interface over which the relevant code(s) (i.e. the service code(s) or secondary service code(s) associated with the service identifier(s) indicated in the message m1 sent by the monitoring UE 1b) are actually announced by an announcing UE 1a. Then, the radio discovery control module 4 preferably checks the supported radio interfaces of the monitoring UE 1b. If the monitoring UE 1b comprises a radio interface which corresponds to the radio interface used by the announcing UE 1a (i.e. a radio interface for the same radio access technology) and is authorized to access the proximity service, the radio discovery control module 4 preferably determines the target radio interface RT of the monitoring UE 1b as the radio interface that corresponds to the radio interface used by the announcing UE 1a. In this way, advantageously, the monitoring UE 1b may perform the monitoring only over the radio interface over which the code(s) are actually transmitted, which allows saving the UE 1b batteries.

Finally, according to the present invention, a monitoring UE 1b detecting a service code that matches a service filter (or, a secondary service code that matches a secondary service filter) reports to the first network module 31 that a match has been detected. The first network module 31 then may respond to the monitoring UE 1b with a message comprising data relating to the considered proximity service (for instance, data concerning the monitored commercial activity, such as daily offers and discounts of a restaurants).

Advantageously, the method according to the present invention allows integrating the procedures for accessing a proximity service according to different radio access technologies. In this way, advantageously, the mobile network operator may offer the possibility to access proximity services to its users by exploiting any one of the radio access technologies supported by the user equipment. The user may then easily access proximity services that are offered over different radio access technologies. In particular, radio access technologies operating over unlicensed frequency bands may be used. This allows saving costs and saving the resources of licensed frequency bands, which may be entirely used for data transmission.

Moreover, advantageously, the present invention allows determining the radio interface that a UE may conveniently use for accessing the proximity service on the basis of a number of parameters, such as the location of the UE, the actual load conditions of the mobile communication network, the availability of radio resources, which allows improving the service provisioning and the user service experience (by avoiding delays, connection drops, etc.).

The invention claimed is:

1. A method for accessing a proximity service in a mobile communication network comprising a network module and a user equipment, said user equipment comprising a primary radio interface configured to operate according to a first radio access technology providing connection to said mobile communication network, and at least one secondary radio interface configured to operate according to at least one second radio access technology different from said first radio access technology, said network module being configured to communicate with said user equipment for enabling the user equipment to access the proximity service, said method comprising:
   a) sending by said user equipment to said network module a request message comprising a request to access said proximity service;
   b) at said network module, generating an answer message adapted to enable access to the proximity service by the user equipment over said primary radio interface; and
   c) converting said answer message into at least one further answer message adapted to enable access to the proximity service by the user equipment over said at least one secondary radio interface.

2. The method according to claim 1, wherein it further comprises subscribing by said user equipment to said proximity service within said mobile communication network and providing to the mobile communication network data indicating an availability of the at least one second radio access technology for accessing said proximity service.

3. The method according to claim 2, wherein said request message further comprises data indicating the at least one second radio access technology and the method further comprises, at said network module, checking, on the basis of said data, whether said user equipment is authorized to access said proximity service via said at least one second radio interface.

4. The method according to claim 1, wherein said request message further comprises one or more service identifiers indicating what information the user equipment is interested to announce or monitor for providing or receiving said proximity service.

5. The method according to claim 4, wherein said answer message comprises one or more service codes to be announced by said user equipment for providing said proximity service over said primary radio interface, said one or more service codes corresponding to said one or more service identifiers, and said converting comprises adapting said one or more service codes to generate, for each of said at least one secondary radio interface, one or more respective secondary service codes to be inserted into a respective one of said at least one further answer message, said one or more respective secondary service codes being adapted to be announced over said each of said at least one secondary radio interface.

6. The method according to claim 5, wherein said converting is performed at said user equipment and the answer message further comprises adaptation information usable by the user equipment for said adapting, said adaptation information indicating a data structure of said one or more service codes.

7. The method according to claim 4, wherein said answer message comprises one or more service filters to be monitored by said user equipment for receiving said proximity service over said primary radio interface, said one or more service filters corresponding to said one or more service identifiers, and said converting comprises adapting said one or more service filters to generate, for each of said at least one secondary radio interface, one or more respective secondary service filters to be inserted into a respective one of said at least one further answer message, said one or more respective secondary service filters being adapted to monitor secondary service codes, associated with the service identifiers, over said each of said at least one secondary radio interface.

8. The network module according to claim 7, wherein the mobile communication network is a 3GPP LTE mobile communication network and the network module comprises a 3GPP ProSe function.

9. The method according to claim 1, wherein it further comprises sending by said network module said at least one further answer message to said user equipment in a transport message adapted to be received by said primary radio interface.

10. The method according to claim 1, further comprising:
   determining, among said primary radio interface and said at least one secondary radio interface, a target radio interface for accessing said proximity service by said user equipment, on the basis of at least one of: a user's profile associated with said user equipment, a location of said user equipment, an actual load condition of said mobile communication network, an availability of radio resources;
   and wherein said converting comprises converting said answer message into a further answer message adapted to enable access to the proximity service by the user equipment over said target radio interface.

11. The method according to claim 10, wherein said converting is performed at said user equipment and the answer message further comprises data indicative of said target radio interface.

12. The method according to claim 1, wherein the mobile communication network is a 3GPP LTE mobile communication network, the primary radio interface is a E-UTRA radio interface and the at least one secondary radio interface comprises a Wi-Fi radio interface, and wherein said answer message is a 3GPP discovery response message and said at least one further answer message comprises a Wi-Fi NAN publish message or a Wi-Fi subscribe message.

13. A mobile communication network comprising a network module according to claim 12, wherein the mobile communication network further comprises a radio discovery module configured to determine, among said primary radio interface and said at least one secondary radio interface, a target radio interface for accessing said proximity service by said user equipment, on the basis of at least one of: a user's profile associated with said user equipment, a location of said user equipment, an actual load condition of said mobile communication network, an availability of radio resources.

14. A network module for a mobile communication network, the network module being configured to communicate with a user equipment for enabling the user equipment to access a proximity service within the mobile communication network, the network module being further configured to:

receive from said user equipment a request message comprising a request to access said proximity service; and generate an answer message adapted to enable access to the proximity service by the user equipment over a primary radio interface of said user equipment configured to operate according to a first radio access technology, said first radio access technology providing connection to said mobile communication network, said network module further comprising an adaptation function configured to convert said answer message into at least one further answer message adapted to enable access to the proximity service by the user equipment over at least one secondary radio interface of said user equipment configured to operate according to at least one second radio access technology different from said first radio access technology.

15. A user equipment for a mobile communication network, the user equipment being configured to communicate with a network module of said mobile communication network for being enabled to access a proximity service within the mobile communication network, the user equipment comprising a primary radio interface configured to operate according to a first radio access technology providing connection to said mobile communication network, and at least one secondary radio interface configured to operate according to at least one second radio access technology different from said first radio access technology, the user equipment being further configured to:

send to said network module of said mobile communication network a request message comprising a request to access said proximity service; and receive from said network module an answer message adapted to enable access to the proximity service by the user equipment over said primary radio interface, said user equipment further comprising an adaptation function configured to convert said answer message into at least one further answer message adapted to enable access to the proximity service by the user equipment over said at least one secondary radio interface.

* * * * *